US007598980B2

(12) United States Patent
Imai et al.

(10) Patent No.: US 7,598,980 B2
(45) Date of Patent: Oct. 6, 2009

(54) IMAGE PICKUP DEVICE FOR JUDGING AND DISPLAYING HAND-WAGGLING LEVEL AND CELLULAR PHONE USING THE SAME

(75) Inventors: Nobuyuki Imai, Shiojiri (JP); Hiroyuki Yokoyama, Suwa (JP)

(73) Assignee: Seiko Epson Corporation (JP)

( * ) Notice: Subject to any disclaimer, the term of this patent is extended or adjusted under 35 U.S.C. 154(b) by 563 days.

(21) Appl. No.: 11/311,801

(22) Filed: Dec. 19, 2005

(65) Prior Publication Data
US 2006/0132615 A1    Jun. 22, 2006

(30) Foreign Application Priority Data
Dec. 21, 2004    (JP)    ............... 2004-368613

(51) Int. Cl.
*H04N 5/228*    (2006.01)
(52) U.S. Cl. ............. 348/208.4; 348/208.2; 348/208.15
(58) Field of Classification Search ............ 348/208.99, 348/208.2, 208.4, 208.5, 208.15
See application file for complete search history.

(56) References Cited

U.S. PATENT DOCUMENTS

| 4,862,277 | A | * | 8/1989 | Iwaibana | ............... 348/208.15 |
| 5,537,180 | A | * | 7/1996 | Matsumoto et al. | ........... 396/52 |
| RE36,578 | E | * | 2/2000 | Kobayashi | .................. 359/554 |
| 6,144,761 | A | * | 11/2000 | Kaneko et al. | ............... 382/154 |
| 6,157,405 | A | * | 12/2000 | Momochi | ................ 348/208.8 |
| 6,476,861 | B1 | * | 11/2002 | Min | ...................... 348/208.15 |
| 7,162,151 | B2 | * | 1/2007 | Nonaka et al. | ................. 396/52 |
| 7,522,826 | B2 | * | 4/2009 | Nomura et al. | ................. 396/55 |
| 2005/0257620 | A1 | * | 11/2005 | Kawauchi et al. | ............. 73/662 |

FOREIGN PATENT DOCUMENTS

| JP | 2000-165704 | | 6/2000 |
| JP | 2000165704 | A * | 6/2000 |
| JP | 2002-139762 | | 5/2002 |
| JP | 2004-080460 | | 3/2004 |
| JP | 2004-088567 | | 3/2004 |
| JP | 2004080460 | A * | 3/2004 |
| JP | 2004088567 | A * | 3/2004 |
| JP | 2004364019 | A * | 12/2004 |

* cited by examiner

*Primary Examiner*—Ngoc-Yen T Vu
(74) *Attorney, Agent, or Firm*—Harness, Dickey & Pierce, P.L.C.

(57) ABSTRACT

An image pickup device includes an electronic image pickup portion for picking up an image of a subject and generating image data, an angular velocity detecting portion for detecting an angular velocity of the electronic image pickup portion, an rotational angle detecting portion for detecting a rotational angle of the image pickup device on the basis of the angular velocity detected by the angular velocity detecting portion, a hand-waggling level judging portion for judging the level of hand-waggling on the basis of the rotational angle detected by the rotational angle detecting portion, and a hand-waggling level display portion for displaying a judgment result of the hand-waggling level judging portion.

9 Claims, 5 Drawing Sheets

IMAGE PICKUP DEVICE FOR JUDGING AND DISPLAYING HAND-WAGGLING LEVEL AND CELLULAR PHONE USING THE SAME

BACKGROUND

1. Technical Field

The present invention relates to an image pickup device having an electronic image pickup portion for generating picking up an image of a subject and generate image data, and a cellular phone using the image pickup device.

2. Related Art

JP-A-2004-88567 (page 1, FIG. 1) discloses an image pickup device in which image data of an image of a subject achieved by an image pickup system are added with hand-waggling information achieved by an angular velocity sensor at the image pickup time and recorded in a memory card, and after the image pickup, the presence or absence of hand-waggling at the image pickup time is displayed on an image display portion, the image data is subjected to correction processing on the basis of the hand-waggling information added to the image data when the image data recorded in the memory card are reproduced, and the image data thus corrected are displayed on the image display portion together with the information on the presence or absence of the hand-waggling at the image pickup time.

According to the image pickup device described in JP-A-2004-88567, since the image data are recorded in the memory card while the hand-waggling information achieved by the acceleration sensor is added to the image data concerned, the image data are subjected to the correction processing on the basis of the hand-waggling information added to the image data and the image data are reproduced together with the hand-waggling information on a display device when the image data are reproduced. Therefore, a user can check the presence or absence of occurrence of hand-waggling, however, there is still an unsolved problem that the user cannot check the degree of occurrence of hand-waggling.

That is, with respect to a general digital camera or a cellular phone equipped with a camera, it is impossible to increase the size of a liquid crystal screen as a display device, and thus even when image data are generated by using an image pickup device having a large number of pixels, it is required to carry out a re-size operation for reducing the image size to a smaller number of pixels to display the image data on the display device, and thus it is difficult to view the degree of occurrence of hand-waggling on the basis of the image data displayed on the display device. Therefore, there is a case where hand-waggling cannot be checked unless the image data are afterwards printed or displayed on a large display screen of a personal computer or the like. Accordingly, it is impossible to pick up an image again after the hand-waggling is checked, and it has been required that the degree of occurrence of hand-waggling can be checked at the image pickup time.

SUMMARY

An advantage of some aspects of the invention is to provide an image pickup device that can display the level of hand-waggling when the hand-waggling occurs, and a cellular phone using the image pickup device.

According to a first aspect of the invention, an image pickup device includes: an electronic image pickup portion for picking up an image of a subject and generating image data; an angular velocity detecting portion for detecting an angular velocity of the electronic image pickup portion; an rotational angle detecting portion for detecting a rotational angle of the image pickup device on the basis of the angular velocity detected by the angular velocity detecting portion; a hand-waggling level judging portion for judging the level of hand-waggling on the basis of the rotational angle detected by the rotational angle detecting portion; and a hand-waggling level display portion for displaying a judgment result of the hand-waggling level judging portion.

According to the first aspect of the invention, when the image of the subject is picked up in the electronic image pickup portion to generate the image data, the angular velocity detected by the angular velocity detecting portion such as a gyro sensor or the like is, for example, integrated to detect the rotational angle, and the hand-waggling level of three or more stages is judged on the basis of the rotational angle thus detected, and the judgment result is displayed on the hand-waggling level display portion. Therefore, the hand-waggling level can be displayed at three or more stages, and a user can view the degree (level) of the hand-waggling, so that the user can clearly determine whether the image data thus picked up should be saved or discarded.

According to a second aspect of the invention, an image pickup device includes: an electronic image pickup portion for picking up an image of a subject and generating image data; an angular velocity detecting portion for detecting an angular velocity of the electronic image pickup portion; an rotational angle detecting portion for detecting a rotational angle of the image pickup device on the basis of the angular velocity detected by the angular velocity detecting portion; a hand-waggling level judging portion for judging a hand-waggling level of three or more stages on the basis of the rotational angle detected by the rotational angle detecting portion; and an image data managing portion for determining on the basis of the judgment result of the hand-waggling level judging portion whether the image data picked up by the image pickup portion should be saved or discarded.

According to the second aspect of the invention, the image data managing portion is provided in place of the hand-waggling level displaying portion of the first aspect of the invention, and it is determined on the basis of the judgment result of the hand-waggling level judging portion by the image data managing portion whether the image data picked up by the image pickup portion should be saved or discarded. Therefore, it can be accurately determined in accordance with the degree of hand-waggling whether the image data should be saved or discarded.

Furthermore, according to a third aspect of the invention, an image pickup device includes: an electronic image pickup portion for picking up an image of a subject and generating image data; an angular velocity detecting portion for detecting an angular velocity of the electronic image pickup portion; an rotational angle detecting portion for detecting a rotational angle of the image pickup device on the basis of the angular velocity detected by the angular velocity detecting portion; a hand-waggling level judging portion for judging a hand-waggling level of three or more stages on the basis of the rotational angle detected by the rotational angle detecting portion; a hand-waggling level display portion for displaying the judgment result of the hand-waggling level judging portion; and an image data managing portion for determining on the basis of the judgment result of the hand-waggling level judging portion whether the image data picked up by the image pickup portion should be saved or discarded.

According to the third aspect of the invention, the degree of hand-waggling can be viewed on the hand-waggling level display portion, and also it can be clearly determined by the image managing portion whether the image data should be saved or discarded.

Furthermore, according to a fourth aspect of the invention, in the image pickup device described above, it is preferable that the image data managing portion carries out the processing of saving the image data picked up by the image pickup portion when the hand-waggling level is within a permissible range, and the processing of discarding the image data concerned when the hand-waggling level is out of the permissible range.

According to the fourth aspect of the invention, it can be automatically performed in the image data managing portion to carry out the image data saving processing when the hand-waggling level is within the permissible range and to carry out the image data discarding processing when the hand-waggling level is out of the permissible range.

According to a fifth aspect of the invention, in the image pickup device described above, it is preferable that when the hand-waggling level is within the permissible range, the image data managing portion carries out the processing of saving the image data picked up by the image pickup portion, and when the hand-waggling level is out of the permissible range, the image data managing portion judges whether a hand-waggling level check mode is set or not, carries out the processing of discarding the image data when the hand-waggling level check mode is not set, carries out saving and checking processing when the hand-waggling level check mode is set, carries out the processing of saving the image data when a check result of the saving and checking processing indicates saving, and carries out the processing of discarding the image data when the check result indicates discard.

According to the fifth aspect of the invention, in the case where under the state that the hand-waggling level is out of the permissible range, when the hand-waggling level check mode is not set the pickup image data are automatically discarded. However, when the hand-waggling level check mode is set, the save and check processing is carried out, and the user selects save or discard of the image data. Therefore, even when hand-waggling occurs, the image data which the user cannot desire to discard can be selected and saved, and the necessary image data which cannot be picked up again can be saved.

According to a sixth aspect of the invention, in the image pickup device described above, it is preferable that the hand-waggling level judging portion has a storage table representing the relationship between the rotational angle and an image damage sensitive level as a hand-waggling level, and calculating the image damage sensitive level on the basis of the rotational angle by referring to the storage table.

According to the sixth aspect of the invention, the image damage sensitive level is calculated on the basis of the rotational angle by referring to the storage table, and the image damage sensitive level thus calculates is set as the hand-waggling level. Therefore, in a range where the rotational angle is small, the level width of the image damage sensitive level can be reduced, and in a range where the rotational angle is large, the level width of the image damage sensitive level can be increased. Therefore, the image damage sensitive level can be set in accordance with the actual hand-waggling level.

Furthermore, according to a seventh aspect of the invention, in the image pickup device of the sixth aspect of the invention, it is preferable that the hand-waggling level judging portion learns the relationship between the rotational angle and the discarding processing to change a judgment threshold value of the image damage sensitive level of the storage table. Therefore, the user can set the judgment threshold value of the image damage sensitive level corresponding a level for discarding the image.

Still furthermore, according to an eighth aspect of the invention, in the image pickup device described above, it is preferable that the angular velocity detecting portion includes a gyro sensor.

According to the eighth aspect of the invention, the angular velocity is detected by the gyro sensor, and thus the angular velocity of the image pickup portion can be accurately detected, and the an accurate rotational angle can be calculated.

According to a ninth aspect of the invention, in the image pickup device of the eighth aspect of the invention, it is preferable that the gyro sensor includes a fixed substrate constructed by a square-shaped quartz thin plate, a pair of exciting vibration arms that are provided to a pair of confronting side surfaces of the fixed substrate through support portions in parallel to each other, and detecting vibration arms linked to the other pair of confronting side surfaces of the fixed substrate.

According to the eighth aspect of the invention, the gyro sensor can be miniaturized, and it can be easily mounted in a digital camera, a cellular phone or the like.

Furthermore, according to a tenth aspect of the invention, a cellular phone is equipped with the image pickup device described above. Therefore, according to the cellular phone, the degree of hand-waggling can be accurately grasped for a cellular phone which is particularly easily hand-waggled, and the judgment of the save or discard of the pickup image data can be accurately performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment when the invention is applied to a cellular phone will be described with reference to the accompanying drawings.

Figure 1A:
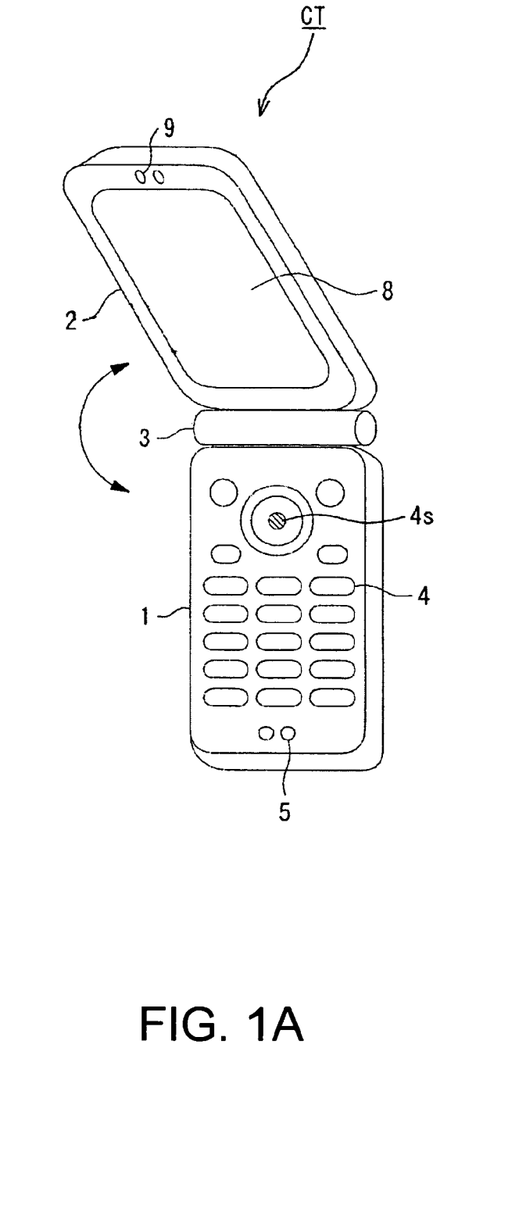
FIGS. 1A and 1B are perspective views showing an embodiment when the invention is applied to a cellular phone.
Figure 1B:
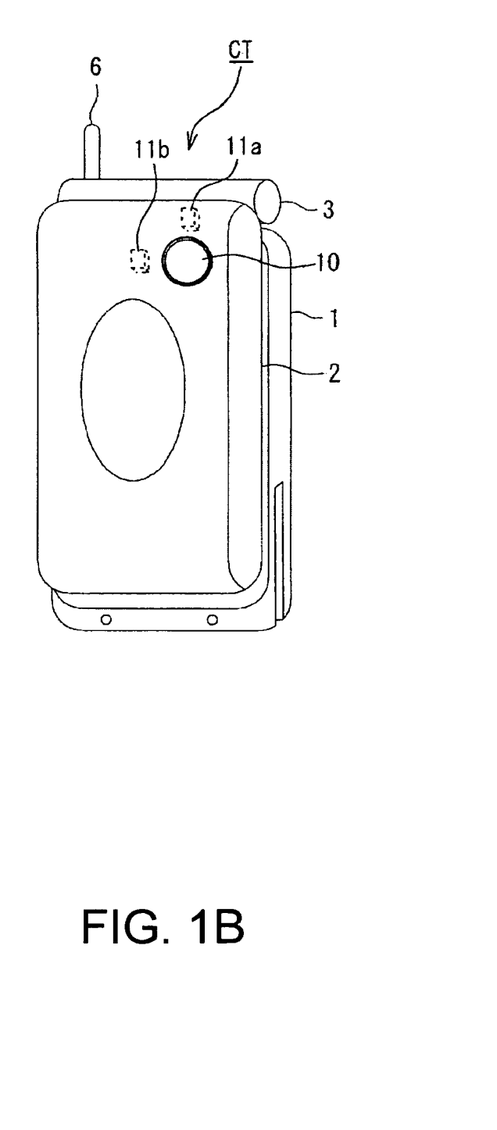

FIGS. 1A and 1B are perspective views showing an embodiment of the invention. In FIGS. 1A and 1B, CT represents a cellular phone, and it is constructed by a base member 1 having a rectangular plate shape and a lid member 2 for covering the upper surface of the base member 1, which are joined to each other through a hinge 3.

As shown in FIG. 1A, an operating portion 4 having operating buttons disposed on the upper surface thereof is disposed on the base member 1. Furthermore, a microphone 5 is disposed at the opposite side to the hinge 3, and a wireless communication antenna 6 that projects outwardly and communicates with a wireless communication base station is secured to the end face of the hinge 3 side as shown in FIG. 1B.

As shown in FIG. 1A, the lid member 2 is equipped with an image display portion 8 so that the image display portion is disposed at the confronting surface of the lid member to the base member 1, and a speaker 9 is provided at the opposite side to the hinge 3 of the image display portion 8. For example, a liquid crystal panel, an organic EL panel, a plasma display panel or the like may be applied as the image display portion 8.

Furthermore, as shown in FIG. 1B, an image pickup device 10 is provided on the back surface of the lid member 2, and gyro sensors 11a and 11b as angular speed detectors in the yaw and pitch directions of the image pickup device 10 are provided in the lid member 2 so as to be located in the neighborhood of the image pickup device 10.

Figure 2:
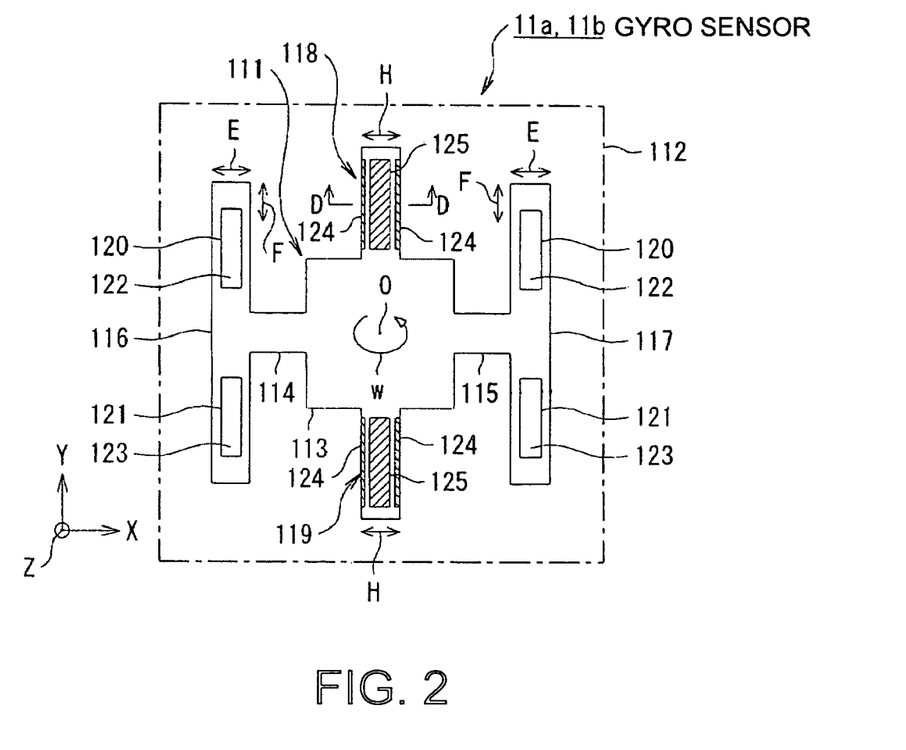
FIG. 2 is a diagram showing the construction of a gyro sensor.

With respect to each of the gyro sensors 11a and 11b, as shown in FIG. 2, a sensor main body 111 is accommodated in a package 112 formed of piezoelectric material or the like, the inside of the package 112 is designed in such a box-shape which the sensor main body 111 can be accommodated, and it is equipped with a driving unit (not shown) such as an exciting circuit for exciting the sensor main body 111 or the like and a circuit (not shown) for detecting vibration from the sensor main body 111.

The sensor main body 111 includes a thin-plate type square-shape fixed substrate 113 achieved by etching quartz, a pair of exciting vibration arms 116 and 117 provided to a pair of confronting side surfaces of the fixed substrate 113 through support portions 114 and 115 so as to be disposed in parallel to each other, and detecting vibration arms 118 and 119 connected to the other pair of confronting side surfaces of the fixed substrate 113. Long grooves 120 and 121 arranged in the longitudinal direction are formed in each of the exciting vibration arms 116 and 117, and exciting electrodes 122 and 123 serving as different poles are disposed in the grooves 120 and 121, respectively.

In the gyro sensors 11a and 11b, a driving voltage is applied from an exciting circuit (not shown) as a driving unit to the exciting vibration arms 116 and 117, whereby the tip portions of the exciting vibration arms 116 and 117 are vibrated so as to approach to each other or go away from each other as shown in an arrow of E in FIG. 2. At this time, when a rotational angular velocity ω acts around the center O of the fixed substrate 113 within the plane of the sheet surface as shown in FIG. 2, Coriolis force Fc acts in the F direction of FIG. 2. This vibration is transmitted through the support portions 114 and 115 and the fixed substrate 113 to the detecting vibration arms 118 and 119. That is, the exciting vibration arms 116 and 117 suffer the Coriolis force Fc acting in the direction of the vector product between the vibration direction in the X-axis direction and the rotational angular velocity ω and alternatively vibrates in +Y direction and −Y direction along the Y axis (walk vibration) in accordance with the equation shown below. This vibration is transmitted through the support portions 114 and 115 and the fixed substrate 113 to the detecting vibration arms 118 and 119, so that the detecting vibration arms 118 and 119 are vibrated as shown by an arrow H in FIG. 2.

$$Fc = 2mV \cdot \omega$$

Here, m represents the mass of the vibration portions of the exciting vibration arms 116 and 117, and V represents the velocity of the exciting vibration arms 116 and 117.

Figure 3:
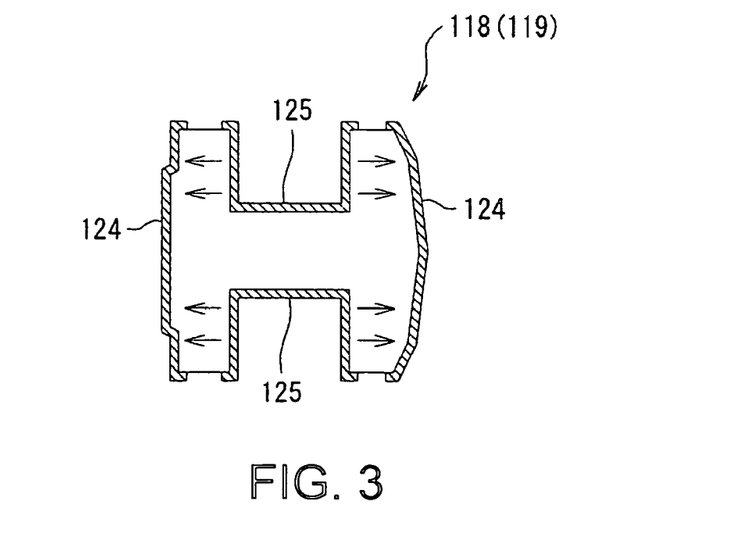
FIG. 3 is a cross-sectional view taken along D-D line of FIG. 2.

Therefore, in the detecting vibration arms 118 and 119, by the vibration thereof in the H direction of FIG. 2, electric field as indicated by an arrow occurs between one detecting electrode 124 and the other detecting electrode 125 of each of the detecting vibration arms 118 and 119 as shown in FIG. 3 representing the cross-section of the arm 118 (119). The electric field based on the vibration of each of the detecting vibration arms 118 and 119 is taken out as a signal, whereby the angular velocity ω can be detected. By using the gyro sensors 11a and 11b thus constructed, the package can be designed in a small size of about 1 mm in square, and thus it can be sufficiently mounted in a cellular phone CT.

Figure 4:
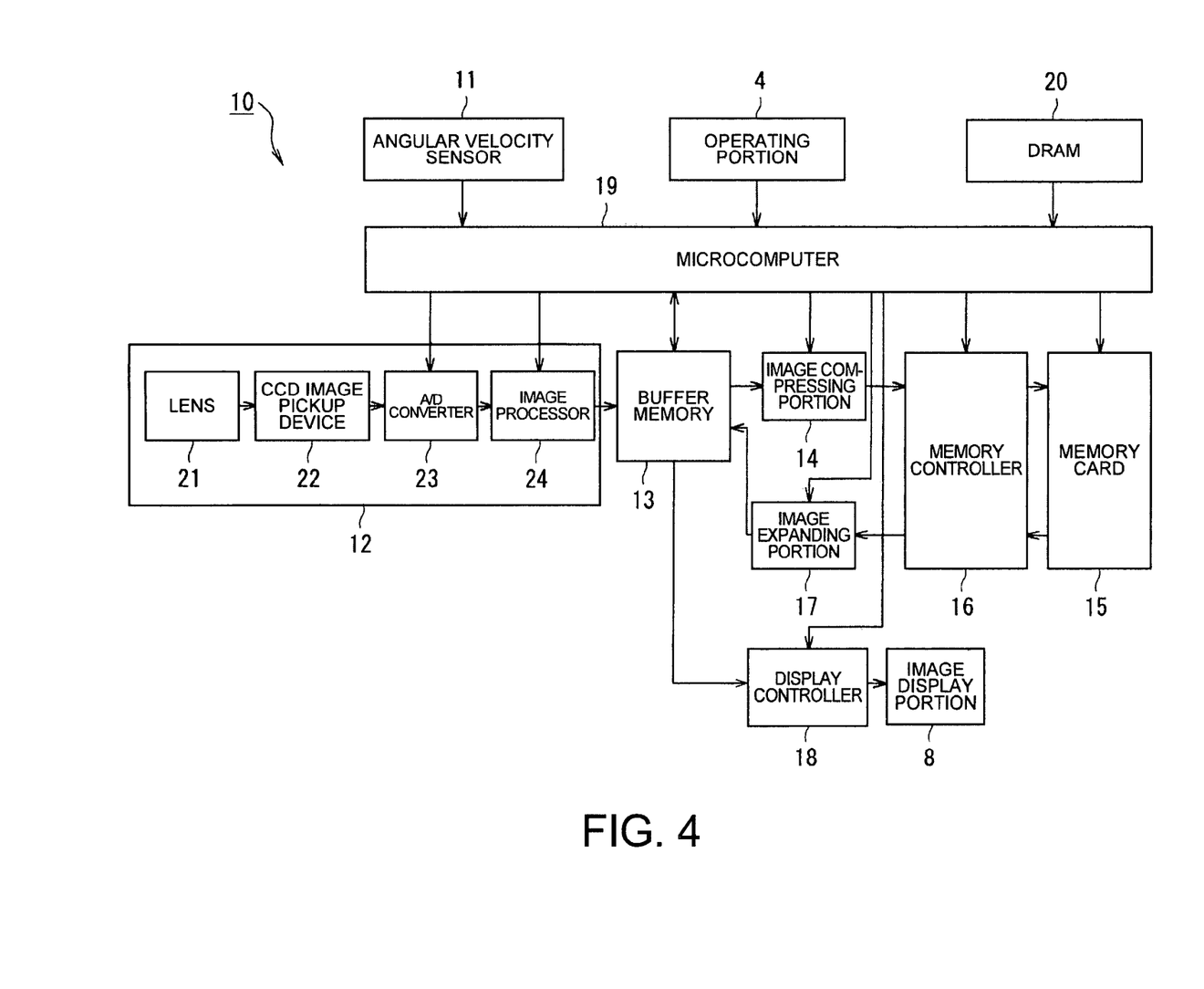
FIG. 4 is a block diagram showing an example of an image pickup device.

As shown in FIG. 4, the image pickup device 10 includes an electronic image pickup portion 12 for picking up an image of a subject, a buffer memory 13 for storing image data output from the electronic image pickup portion 12, an image compression portion 14 for subjecting the image data stored in the buffer memory 13 to image compression processing in JPEG format, for example, thereby forming compressed image data, a memory controller 16 for writing the compressed image data output from the image compression portion 14 into a memory card 15 and reading the image data from the memory card 15, an image expansion portion 17 for subjecting the compressed image data read out by the memory controller 16 to image expansion according to the JPEG format and then storing the image data thus expanded into the buffer memory 13, a display controller 18 for re-sizing the image data stored in the buffer memory 13 to image data of a smaller number of pixels and displaying the image data thus re-sized on the image display portion 8, an image pickup portion 12, a buffer memory 13, an image compression portion 14, a memory card 15, a memory controller 16, and a microcomputer 19 for controlling the display controller 18.

The microcomputer 19 is supplied with the angular velocity detected by the gyro sensors 11a and 11b and the operation signal input from the operating portion 4, and various kinds of programs such as an operating system, an application program, etc. stored in DRAM 20 are executed to control the image pickup portion 12, the buffer memory 13, the image compression portion 14, the memory card 15, the memory controller 16 and the display controller 18.

Here, in the image pickup portion 12, a subject image which is transmitted through a lens 21 and incident to the image pickup portion 12 is subjected to photoelectric conversion by a CCD image pickup device 22, and a photoelectrically converted analog signal output from the CCD image pickup device 22 is converted to a digital signal in an A/D converter 23 and then supplied to an image processor 24. In the image processor, the digital signal is subjected to various image correction processing such as gamma correction, white balance adjustment, etc., for example, and then output to the buffer memory 13.

Figure 5:
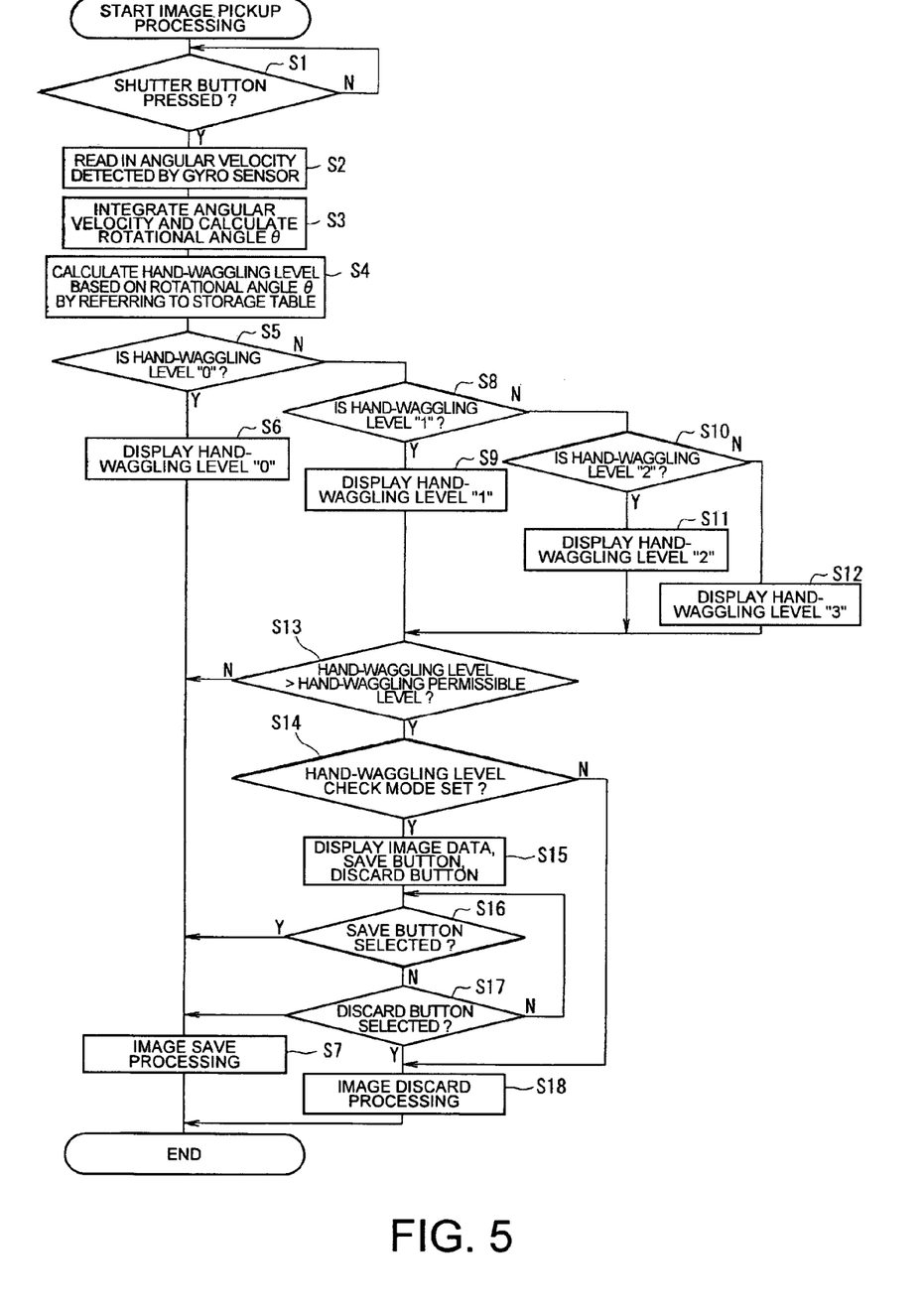
FIG. 5 is a flowchart showing an example of the procedure of an image pickup processing executed in a microcomputer of FIG. 4.

The image pick-up processing shown in FIG. 5 is carried out in the microcomputer 19.

The image processing is started when an image pickup mode is selected on a menu screen. First, in step S1, it is judged whether a shutter button 4s is pressed or not by the operating portion 4. If it is judged that the shutter button 4s is not pressed, the processing waits until the shutter button 4s is pressed. If it is judged that the shutter button 4s is pressed, the processing goes to step S2.

In step S2, the angular velocity detected by the gyro sensors 11a and 11b is read in, and then the processing goes to step s3 to integrate the read angular velocity and calculate the rotational angle θ.

Subsequently, the processing goes to step S4 to calculate an image damage sensitive level, that is, a hand-waggling level on the basis of the rotational angle θ thus calculated by referring to a storage table in which the relationship between the rotational angle θ and the image damage sensitive level as the hand-waggling level is stored in advance.

Figure 6:
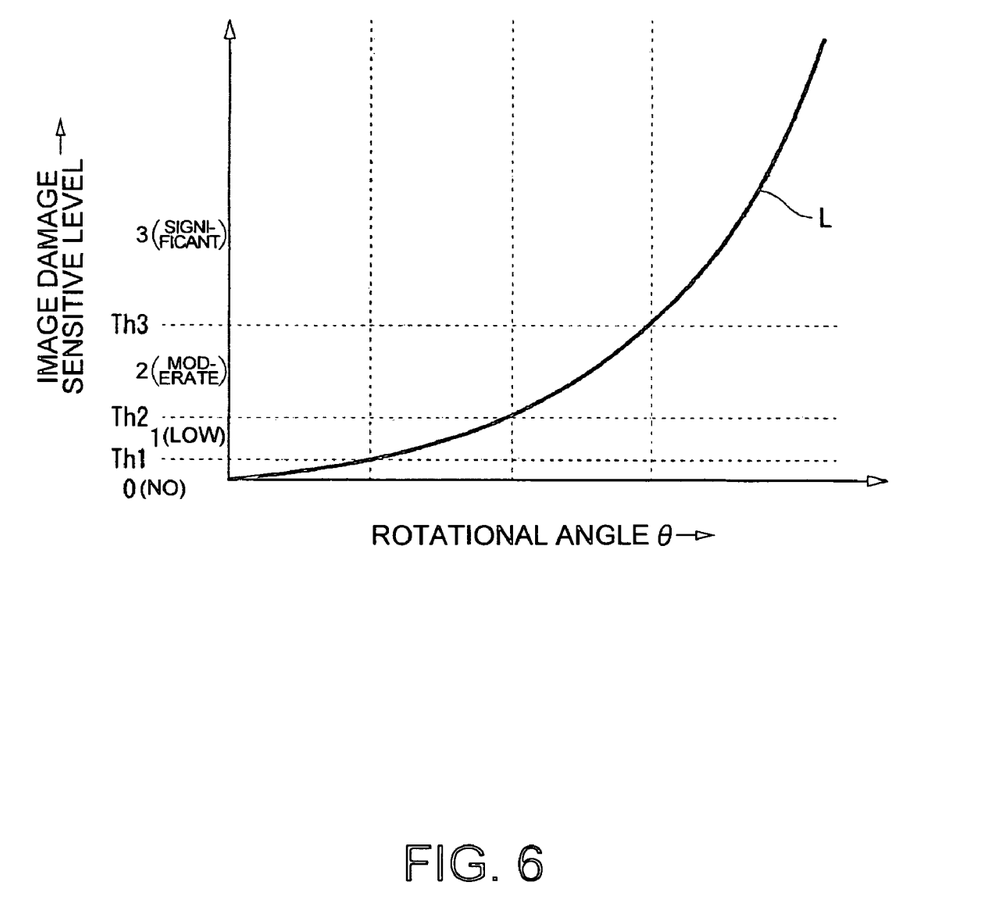
FIG. 6 is a diagram showing a characteristic representing a storage table used in image pickup processing of FIG. 5.

Here, the storage table is shown in FIG. 6 and set as follows. A parabolic characteristic line L having a moderate curve is set in a two-dimensional table in which the rotational angle θ is plotted on the abscissa axis and the image damage sensitive level is plotted on the ordinate axis as shown in FIG. 6. When the rotational angle θ is equal to "0", the image damage sensitive level is also equal to "0", and a line that is parallel to the abscissa axis and passes through the cross point between the characteristic line L and each of a first predetermined value θa, a second predetermined value θb and a third predetermined value θc which are set at predetermined angular intervals is set as an image damage sensitive level judging threshold value Th1, Th2, Th3. The area between the image damage sensitive level of "0" and the image damage sensitive level judging threshold value Th1 is set to a level 0 representing no hand-waggling, the area between the image damage sensitive level judgment threshold value Th1 and the image damage sensitive level judgment threshold value Th2 is set to a level 1 (small), the area between the image damaged sensitive level judgment threshold value Th2 and the image damage sensitive level judgment threshold value Th3 is set to a level 2 (middle), and the area above the image damage sensitive level judgment threshold value Th3 is set to a level 3 (large). That is, the level width is increased as the hand-waggling level is increased.

Subsequently, the processing goes to step S5 to judge whether the hand-waggling level calculated in step S4 is equal to "0" or not. If the hand-waggling level is equal to "0", it is judged that there is no hand-waggling, and then the processing goes to step S6 and an indicator representing that the hand-waggling level is equal to "0" is displayed together with the subject image on the image display portion 8. Subsequently, the processing goes to step S7 to subject the image data stored in the buffer memory 13 to image compression based on the JPEG format in the image compression portion 13, the save processing of storing the image data thus compressed into the memory card 15 by the memory controller 16 is executed, and then the processing is finished. The indicator representing the hand-waggling level may be represented in any style such as a bar graph, a numerical style or the like.

If the judgment result of step S5 indicates that the hand-waggling level is a value other than "0", the processing goes to step S8 to judge whether the hand-waggling level calculated in step S4 is equal to "1" or not. If the hand-waggling level is equal to "1", the processing goes to step S9, and an indicator representing that the hand-waggling level is equal to "1" is displayed together with the subject image on the image display portion 8. Then, the processing goes to step S13, and when the hand-waggling level exceeds "1", the processing goes to step S10.

In step S10, it is judged whether the hand-waggling level calculated in step S4 is equal to "2" or not. If it is judged that the hand-waggling level is equal to "2", the processing goes to step S11, and an indicator representing that the hand-waggling level is equal to "2" is displayed together with the subject image on the image display portion 8. Then, the processing goes to step S13, and when the hand-waggling level exceeds "2", the processing goes to step S12.

In step S12, an indicator representing that the hand-waggling level is equal to "3" is displayed together with the subject image on the image display portion 8, and then the processing goes to step S13.

In step S13, it is judged whether the hand-waggling level exceeds a preset hand-waggling permissible level or not. If the hand-waggling level is not more than the permissible level, the processing goes to step S7. On the other hand, if the hand-waggling level exceeds the permissible level, the processing goes to step S14.

In step S14, it is judged whether the hand-waggling level check mode is set or not. If the hand-waggling level check mode is not set, the processing jumps to step S18 described later. If the hand-waggling level check mode is set, the processing goes to step S15 to re-size the image data stored in the buffer memory 13 by the display controller 18. The image data thus re-sized are displayed on the image display portion 8, and also a saving button for saving the image data and a discard button for discarding the image data are displayed on the image display portion 8.

Subsequently, the processing goes to step S16 to judge whether the saving button is selected or not. If the saving button is selected, the processing goes to step S7. If the saving button is not selected, the processing goes to step S17 to judge whether the discard button is selected or not. When the discard button is not selected, the processing returns to the step S16, and if the discard button is selected, the processing goes to step S18 to delete the image data stored in the buffer memory 13 and then finish the image processing.

In the processing of FIG. 5, the processing of the steps S2 and S3 corresponds to the rotational angle detecting portion, the processing of the step S4 corresponds to the hand-waggling level judging portion, the processing of the steps S5 to S12 and the image display portion 8 correspond to the hand-waggling level display portion and the processing of the steps S7, S13 to S18 corresponds to the image data managing portion.

Next, the operation of the embodiment described above will be described.

When the image pickup mode is selected from the menu screen on the image display portion 8 under the state that the lid member 2 is opened with respect to the base member 1 in the cellular phone CT as shown in FIG. 1A, the image pickup processing shown in FIG. 5 is started.

When the lens 21 trains the subject under the above state, the subject image is transmitted through the lens 21 and focused on the CCD image pickup device 22. The subject image is photoelectrically converted in the CCD image pickup device 22 to generate an analog signal, and the analog signal output from the CCD image pickup device 22 is converted to a digital signal in the A/D converter 23, and then the digital signal is subjected to various kinds of image correction processing such as gamma correction, white balance adjustment, etc. in the image processor 24. The image data thus corrected are stored in the buffer memory 13. The image data stored in the buffer memory 13 are re-sized to data having a lower number of pixels in the display controller 18 and then displayed on the image display portion 8.

Therefore, a user tries to make various picture compositions while viewing the subject image displayed on the image display portion 8, and when the user presses the shutter button 4s at the time when the user settles a picture composition, a shutter sound is emitted, and also writing of image data into the buffer memory 13 is prohibited.

When the shutter button 4s is pressed as described above, in the processing of FIG. 5, the processing goes from the step S1 to the step S2 to read in the angular velocity detected by the gyro sensors 11a and 11b at that time, and the read angular velocity is integrated to calculate the rotational angle θ (step S3).

On the basis of the rotational angle θ, the image damage sensitive level, that is, the hand-waggling level is calculated by referring to the storage table shown in FIG. 6.

At this time, when the rotational angle θ is substantially equal to "0", there is little hand-wagging, and "0" is calculated as the image damage sensitive level. Therefore, an indicator representing that the hand-waggling level is equal to "0" is displayed together with the subject image on the image display portion 8 (step S6). Thereafter, the image data stored in the buffer memory 13 is output to the image compression portion 14, and the image compression processing based on JPEG format is carried out to form compressed image data. The compressed image data are stored at a predetermined writing address of the memory card 15 by the memory controller 16 to thereby perform the image save processing.

It is assumed that the rotational angle θ exceeds a first predetermined value θa and is equal to a value not more than a second predetermined value θb due to occurrence of hand-waggling when the shutter button 4s is pressed. Under this state, the image damage sensitive level is equal to "1" when the storage table of FIG. 6 is referred to (step S4), and the processing goes from step S5 through step S8 to step S9 so that an indicator representing the hand-waggling level is equal to "1" is displayed together with the subject image on the image display portion 8.

At this time, assuming that the hand-waggling permissible level is set to the hand-waggling level "1" in advance, the hand-waggling level "1" is equal to the hand-waggling permissible level "1", and thus it is judged that the hand-waggling level is within the permissible range. Therefore, the processing goes from step S13 to step S7 to carry out the image save processing described above, and the image data are stored at a predetermined address of the memory card 15.

However, in a case where great hand-waggling occurs when the shutter button 4s is pressed and thus the rotational angle θ exceeds the second predetermined value θb, but is not more than a third predetermined value θc, the image damage sensitive level is equal to "2", and when the rotational angle θ exceeds the third predetermined value θc, the image damage sensitive level is set to "3", and an indicator representing the hand-waggling level "2" or "3" is displayed together with the subject image on the image display portion 8.

Since the hand-waggling level exceeds the hand-waggling permissible level under this state, the processing goes from step S13 to step S14 to judge whether the hand-waggling level check mode is set or not. At this time, assuming that the hand-waggling level check mode is not set, the processing directly goes to step S18 to carry out the image discard processing of deleting the image data stored in the buffer memory 13, whereby the subject image displayed on the image display portion 8 is also deleted.

At this time, when the hand-waggling level check mode is set, the processing goes from step S14 to step S15 to display the saving button and the discard button together with the subject image on the image display portion 8, and under this state the user views the subject image and judges whether the subject image should be saved or discarded. If the subject image should be saved, the operating portion 4 is operated and the saving button is selected, whereby the processing goes to step S7 to carry out the image save processing described above. On the other hand, if the image data should be discarded, the operating portion 4 is operated to select the discard button, and the processing goes to step S18 to carry out the image discard processing described above.

As described above, according to this embodiment, when the shutter button 4s is pressed, the rotational angle θ is calculated on the basis of the angular velocity in the neighborhood of the image pickup device 10 which is detected by the gyro sensors 11a and 11b, and the image damage sensitive level, that is, the hand-waggling level is calculated on the basis of the calculated rotational angle θ by referring to the storage table and displayed on the image display portion 8. In addition, when the hand-waggling level is equal to "0" or not more than the hand-waggling permissible level, the image data stored in the buffer memory 13 is subjected to compression processing and the compressed image data are stored in the memory card 15. On the other hand, when the hand-waggling level is exceeds the hand-waggling permissible level, if the hand-waggling level check mode is not set, the image discard processing is automatically executed. Therefore, cumbersome save and discard selecting processing can be omitted.

On the other hand, in the case where the hand-waggling level check mode is set, when the hand-waggling level exceeds the hand-waggling permissible level, the user can select save or discard of the image data on the basis of the hand-waggling level and the subject image displayed on the image display portion 8. Therefore, even when occurrence of hand-waggling cannot be checked on the subject image, an occurrence state of hand-waggling can be accurately grasped at the hand-waggling level, and thus it can be accurately judged that the image data should be saved or discarded.

Furthermore, when it is estimated that it is impossible to pick up an image at the display level again, the image data can be subjected to the save processing irrespective of the presence or absence of occurrence of hand-waggling by setting the hand-waggling level check mode.

Then, the cellular phone CT is connected to the personal computer through a USB interface, or the memory card 15 is taken out from the cellular phone CT and then mounted in a memory card reader connected to the personal computer. Thereafter, the image data stored in the memory card 15 are taken into the personal computer, and displayed on a display device such as a large-size liquid crystal display, a CRT display or the like. Accordingly, the hand-waggling state is checked and the hand-waggling permissible level is reset on the basis of the check result. Accordingly, the image save processing can be automatically carried out when the hand-waggling level is not more than the hand-waggling permissible level corresponding to user's fancy, and unnecessary image data having a large hand-waggling level can be surely prevented from being saved.

In addition, when hand-waggling easily occurs like a cellular phone CT, the hand-waggling level can be accurately visually recognized, and thus the judgment on the save or discard of the image data can be accurately performed.

In the above embodiment, the image damage sensitive level is set to four stages of "0" to "3". However, the invention is not limited to this embodiment, and it may be set to any number of stages such as three stages of "0" to "2" or five or more stages.

Furthermore, in the above embodiment, the storage table representing the relationship between the rotational angle θ and the image damage sensitive level is fixed. However, the invention is not limited to this embodiment. For example, under the hand-waggling level check mode is set, the hand-waggling level of discarded image data is learned, and the values of the image damage sensitive level judging threshold values Th1 to Th3 are changed on the basis of the learn result, whereby the image damage sensitive level judging threshold values Th1 to Th3 can be automatically set in accordance with user's fancy.

Still furthermore, in the above embodiment, the invention is applied to a cellular phone CT. However, this invention is not limited to this embodiment. For example, the invention may be applied to a single image pickup device such as a digital camera or the like, cellular equipment such as PDA (Personal Digital Assistance) or the like.

Still furthermore, in the above embodiment, the gyro sensors $11a$ and $11b$ are applied as the angular velocity detector. However, this invention is not limited to this embodiment. For example, another angular velocity sensor or acceleration sensor may be applied.

The entire disclosure of Japanese Patent Application No. 2004-368613, filed Dec. 21, 2004 is expressly incorporated by reference herein.

What is claimed is:

1. An image pickup device comprising:
   an electronic image pickup portion for picking up an image of a subject and generating image data;
   an angular velocity detecting portion for detecting an angular velocity of the electronic image pickup portion;
   a rotational angle detecting portion for detecting a rotational angle of the image pickup device on the basis of the angular velocity detected by the angular velocity detecting portion;
   a hand-waggling level judging portion for judging a level of hand-waggling on the basis of the rotational angle detected by the rotational angle detecting portion, wherein the hand-waggling level judging portion has a storage table representing the relationship between the rotational angle and an image damage sensitive level as the level of hand-waggling, and wherein the hand-waggling level judging portion determines the image damage sensitive level on the basis of the rotational angle by referring to the storage table; and
   a hand-waggling level display portion for displaying a judgment result of the hand-waggling level judging portion;
   wherein the storage table includes a first range of image damage sensitive level threshold values and a second range of image damage sensitive levels, wherein the first range corresponds to lower rotational angles than the second range, and wherein the second range is larger than the first range, and
   wherein the storage table includes a first axis representing the rotational angle, a second axis representing the image damage sensitive level, and a substantially parabolic curve representing a relationship between the rotational angle and the image damage sensitive level.

2. The image pickup device of claim 1, wherein the hand-waggling level judging portion judges three or more stages of the hand-waggling level, and further comprising an image data managing portion for determining on the basis of the judgment result of the hand-waggling level judging portion whether the image data picked up by the image pickup portion should be saved or discarded.

3. The image pickup device according to claim 1, further comprising an image data managing portion that carries out the processing of saving the image data picked up by the image pickup portion when the hand-waggling level is within a permissible range, and the processing of discarding the image data concerned when the hand-waggling level is out of the permissible range.

4. The image pickup device according to claim 3, wherein when the hand-waggling level is within the permissible range, the image data managing portion carries out the processing of saving the image data picked up by the image pickup portion, and when the hand-waggling level is out of the permissible range, the image data managing portion judges whether a hand-waggling level check mode is set or not, carries out the processing of discarding the image data when the hand-waggling level check mode is not set, carries out saving and checking processing when the hand-waggling level check mode is set, carries out the processing of saving the image data when a check result of the saving and checking processing indicates saving, and carries out the processing of discarding the image data when the check result indicates discard.

5. The image pickup device according to claim 4, wherein the hand-waggling level judging portion learns the relationship between the rotational angle and the discarding processing to change a judgment threshold value of the image damage sensitive level of the storage table.

6. The image pickup device according to claim 1, wherein the angular velocity detector comprises a gyro sensor.

7. The image pickup device according to claim 6, wherein the gyro sensor comprises a fixed substrate constructed by a square-shaped quartz thin plate, a pair of exciting vibration arms that are provided to a pair of confronting side surfaces of the fixed substrate through support portions in parallel to each other, and detecting vibration arms linked to the other pair of confronting side surfaces of the fixed substrate.

8. A cellular phone equipped with the image pickup device according to claim 1.

9. An image pickup device comprising:
   an electronic image pickup portion for picking up an image of a subject and generating image data;
   an angular velocity detecting portion for detecting an angular velocity of the electronic image pickup portion;
   a rotational angle detecting portion for detecting a rotational angle of the image pickup device on the basis of the angular velocity detected by the angular velocity detecting portion;
   a hand-waggling level judging portion for judging a hand-waggling level of three or more stages on the basis of the rotational angle detected by the rotational angle detecting portion, wherein the hand-waggling level judging portion has a storage table representing the relationship between the rotational angle and an image damage sensitive level as the hand-waggling level, and wherein the hand-waggling level judging portion determines the image damage sensitive level on the basis of the rotational angle by referring to the storage table; and
   an image data managing portion for determining on the basis of the judgment result of the hand-waggling level judging portion whether the image data picked up by the image pickup portion should be saved or discarded;
   wherein the storage table includes a first range of image damage sensitive level threshold values and a second range of image damage sensitive levels, wherein the first range corresponds to lower rotational angles than the second range, and wherein the second range is larger than the first range, and
   wherein the storage table includes a first axis representing the rotational angle, a second axis representing the image damage sensitive level, and a substantially parabolic curve representing a relationship between the rotational angle and the image damage sensitive level.

* * * * *